UNITED STATES PATENT OFFICE.

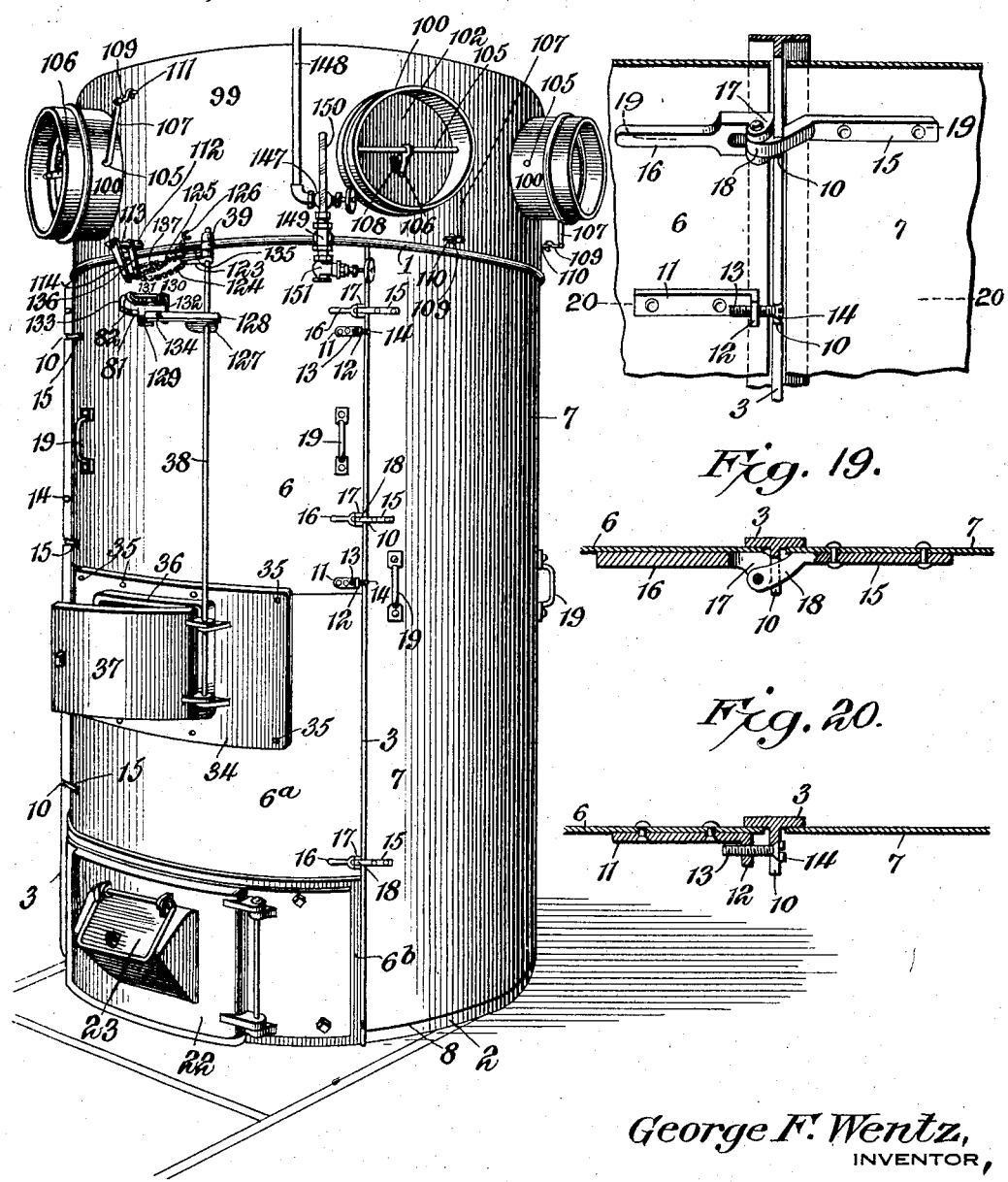

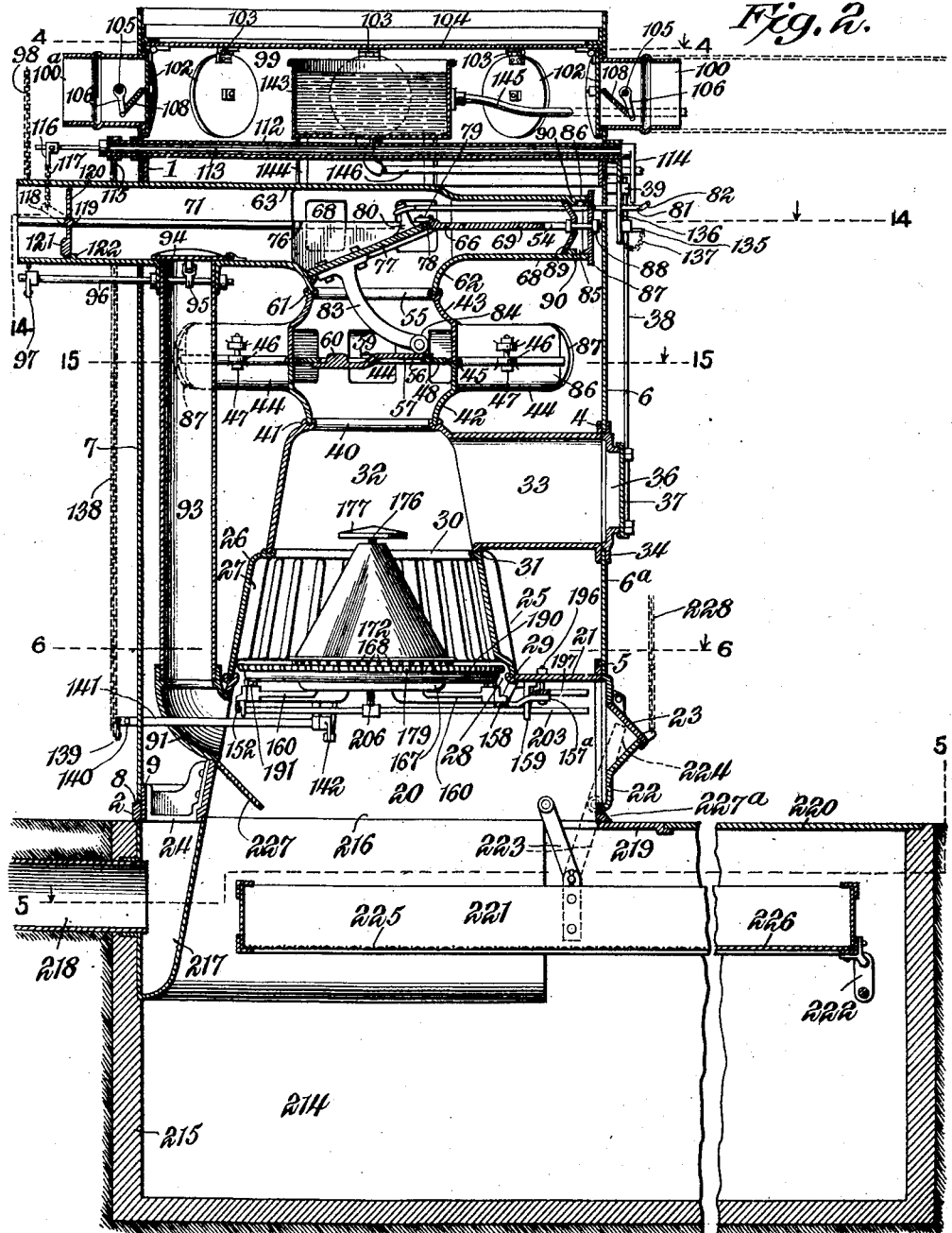

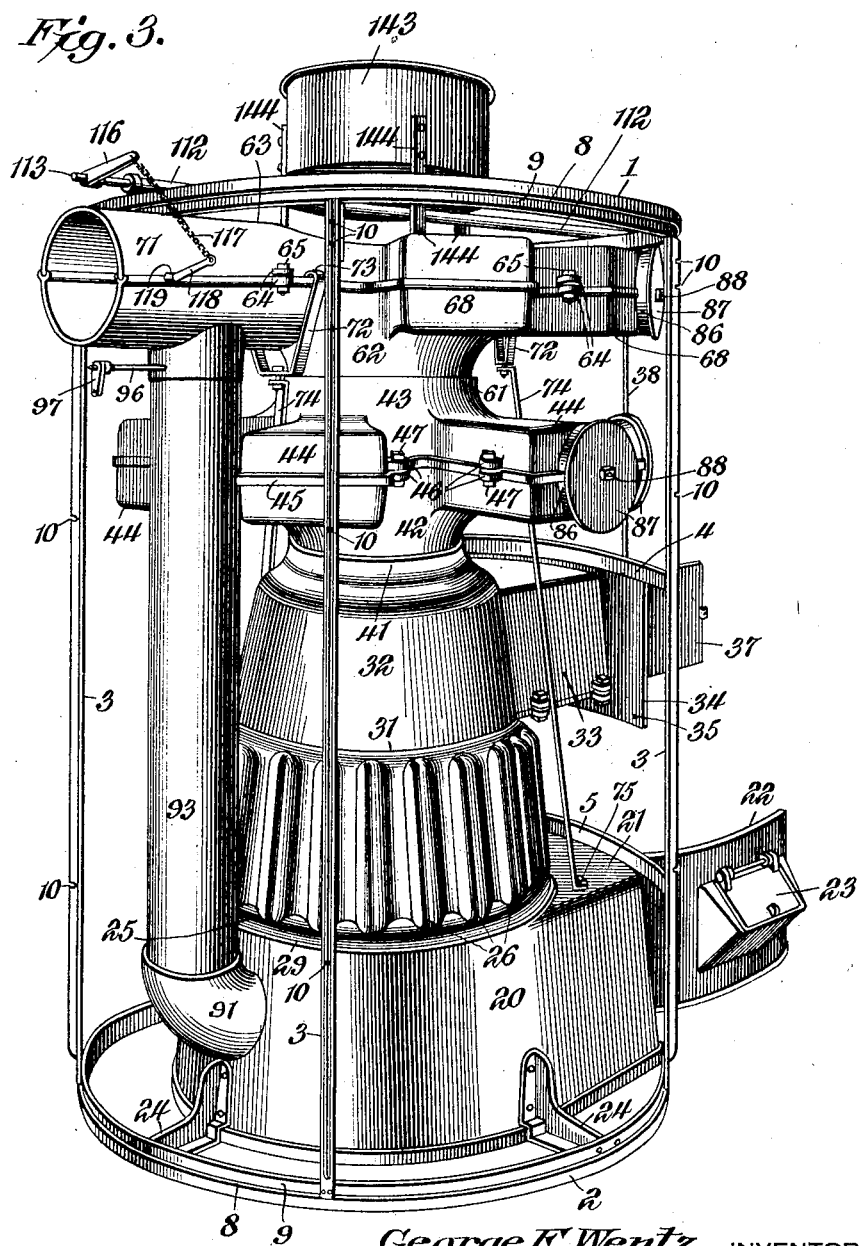

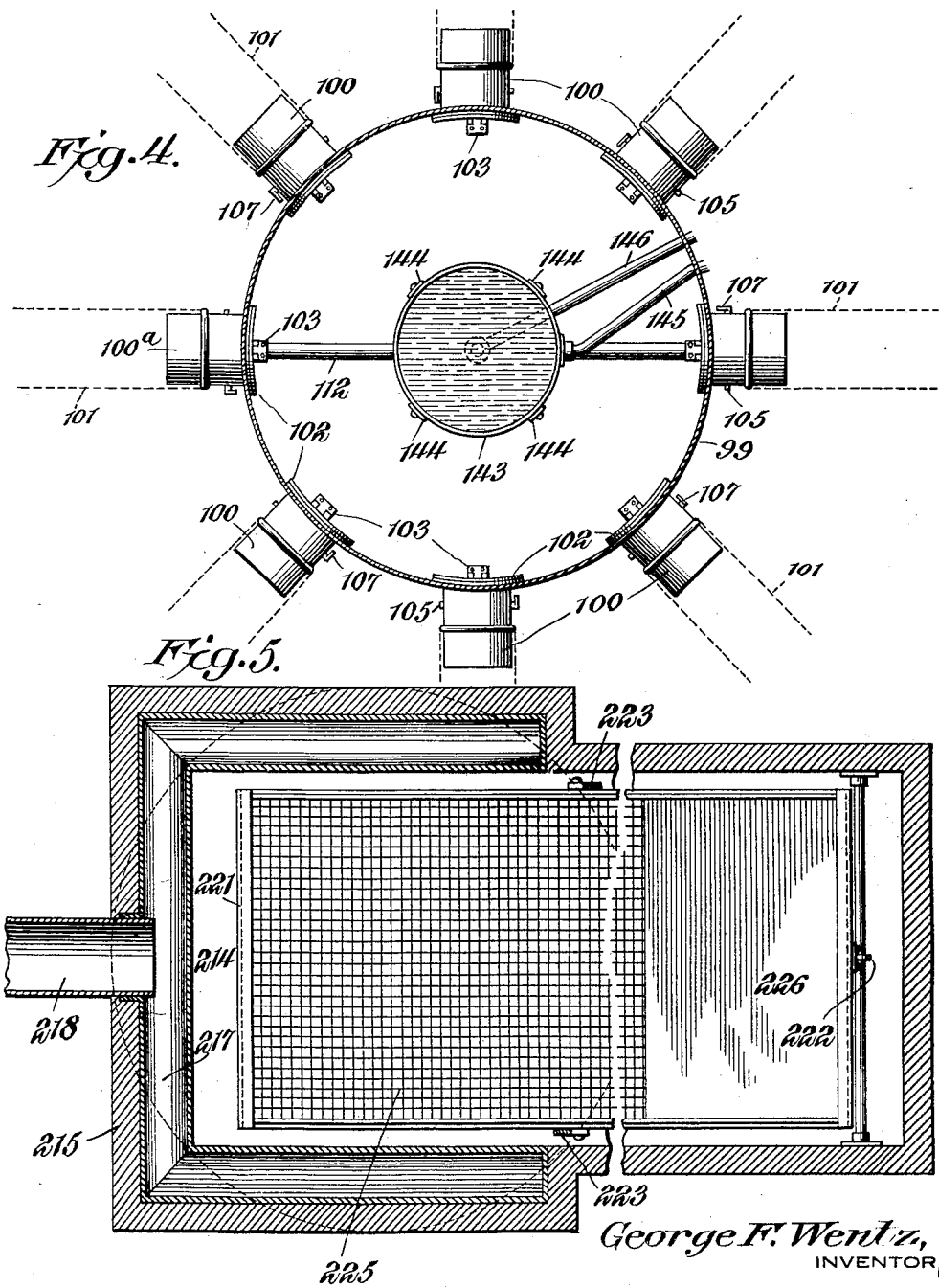

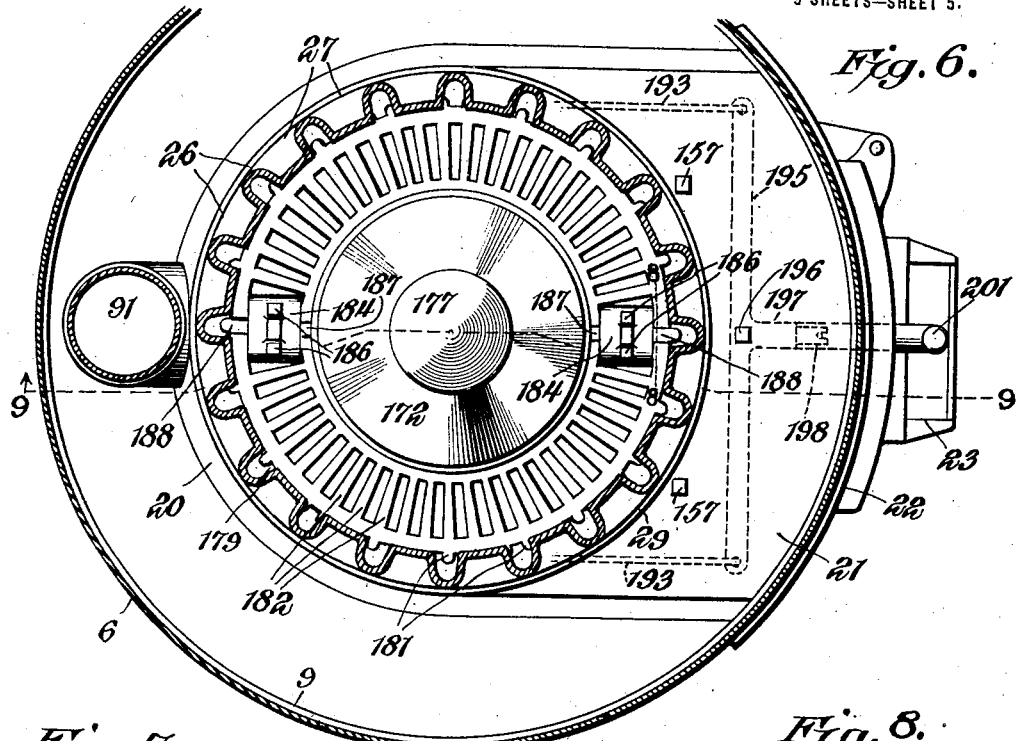
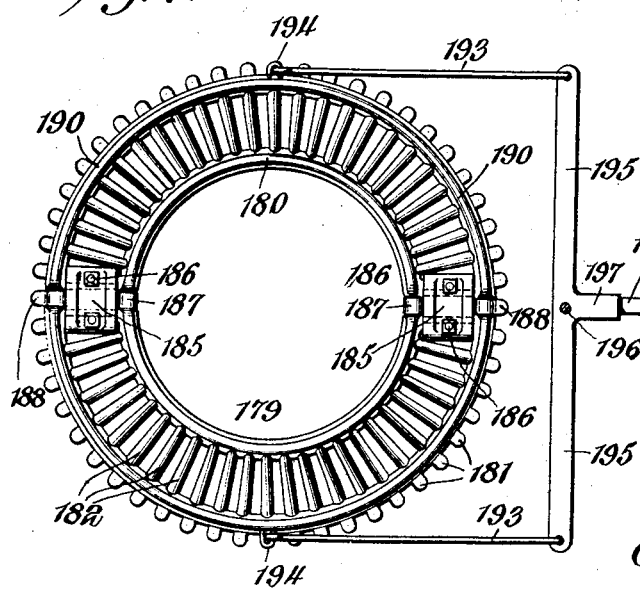
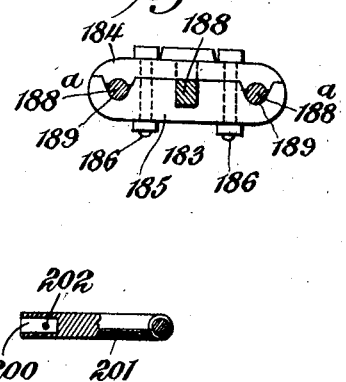

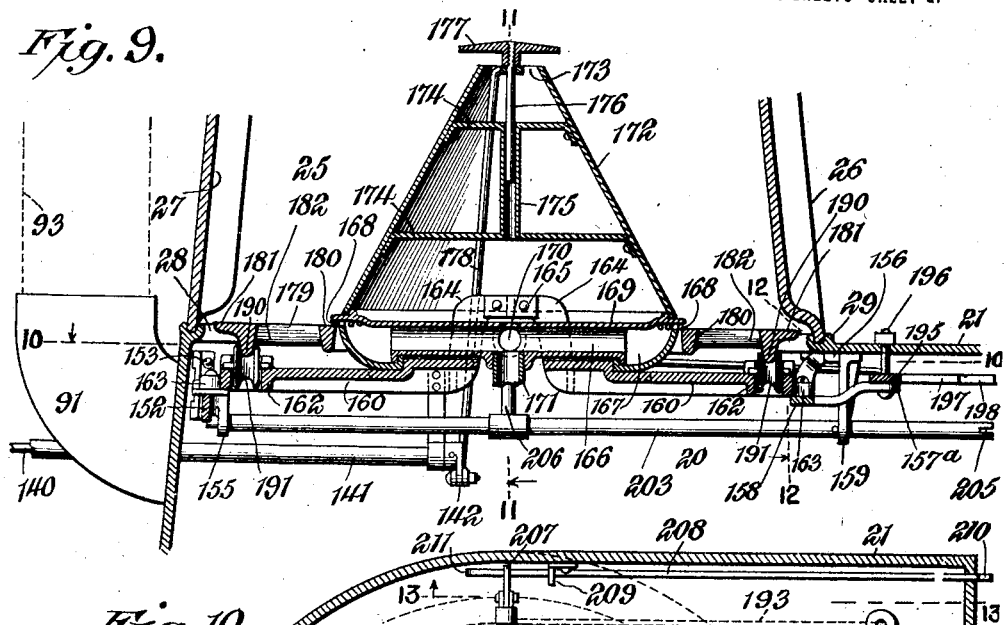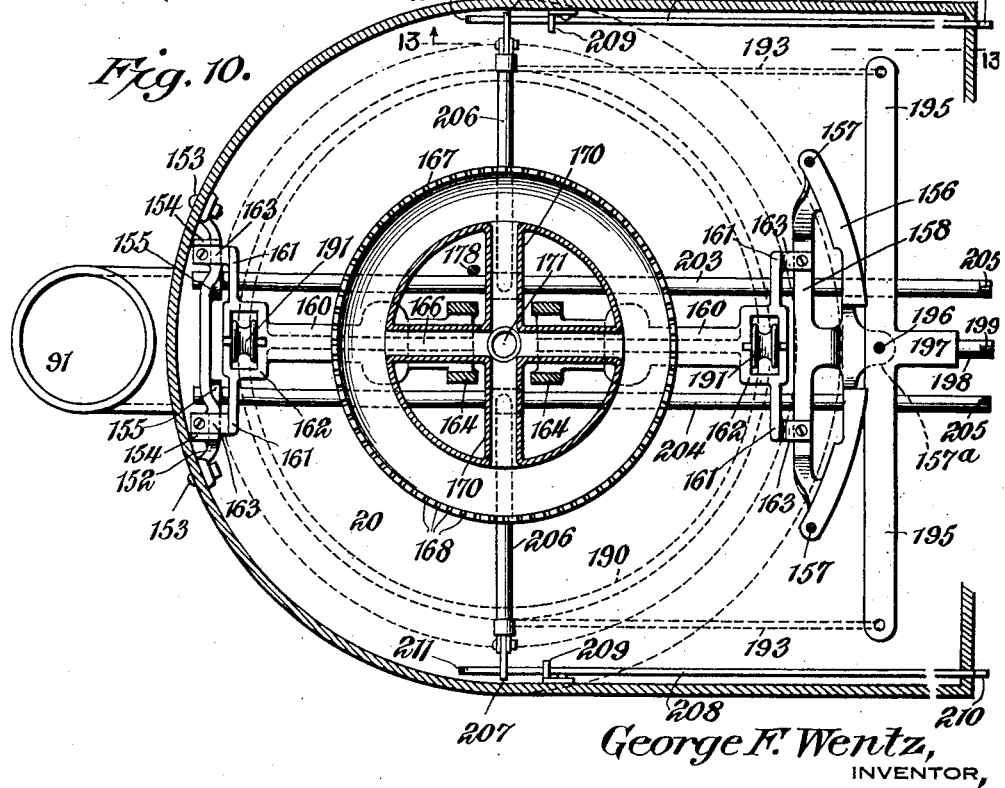

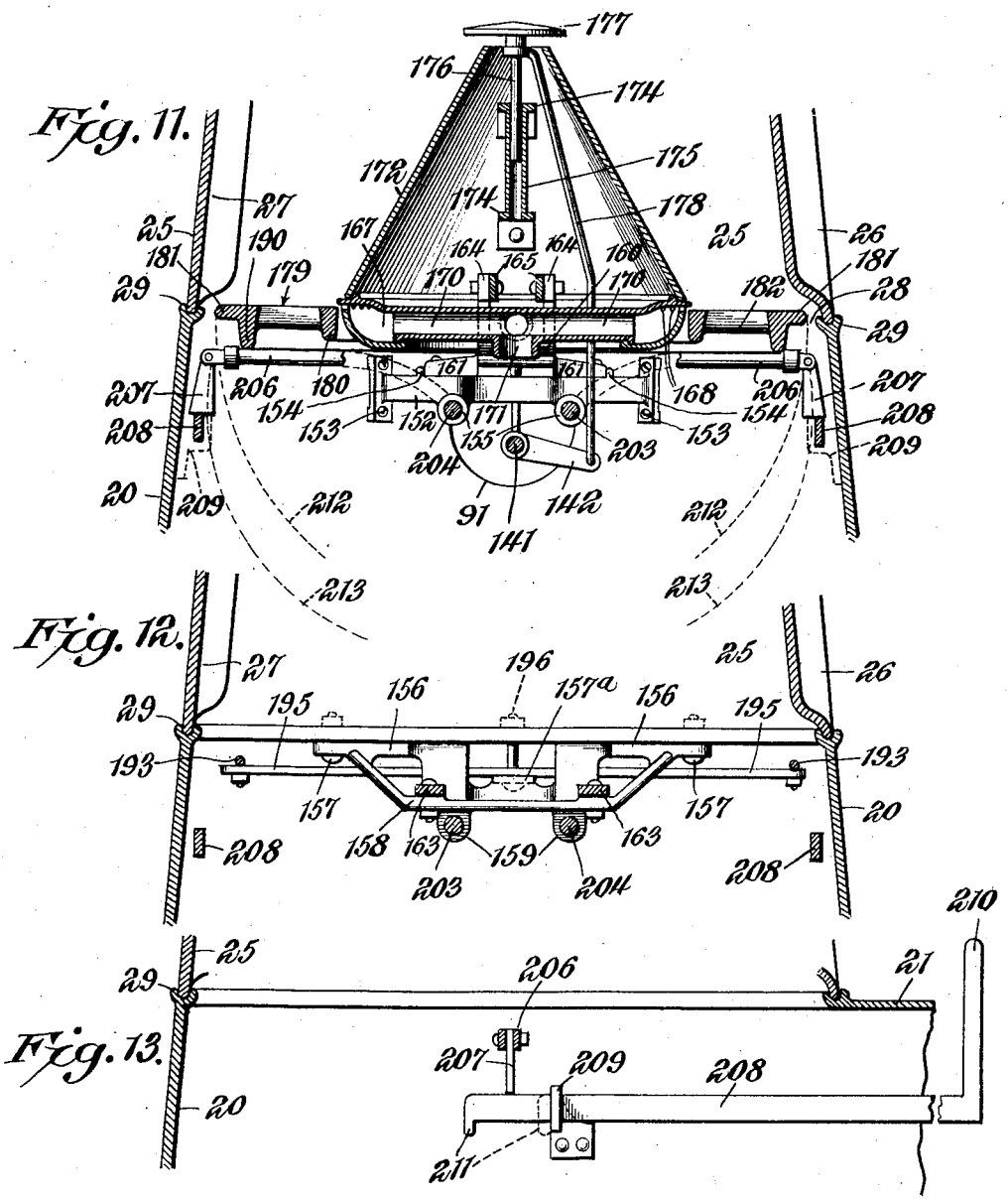

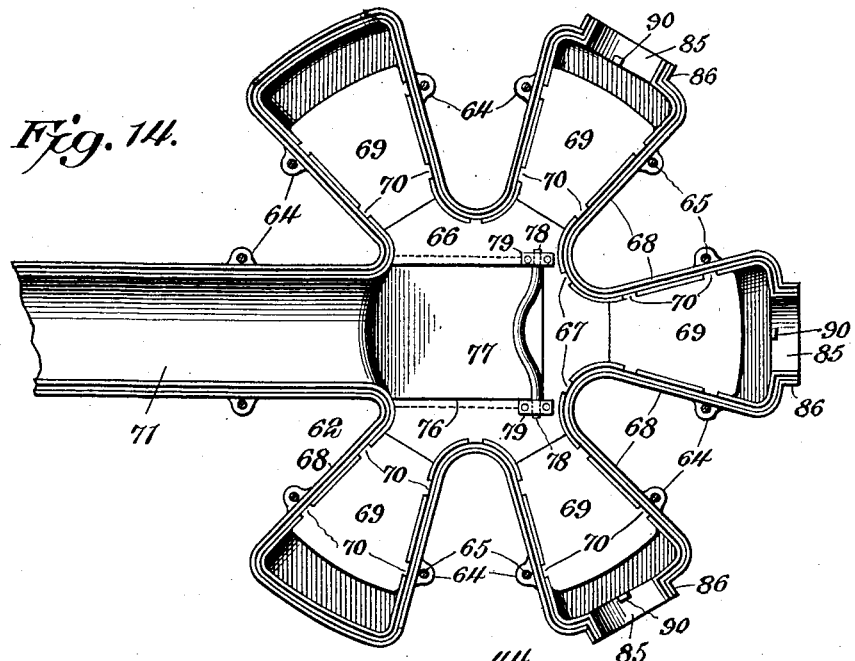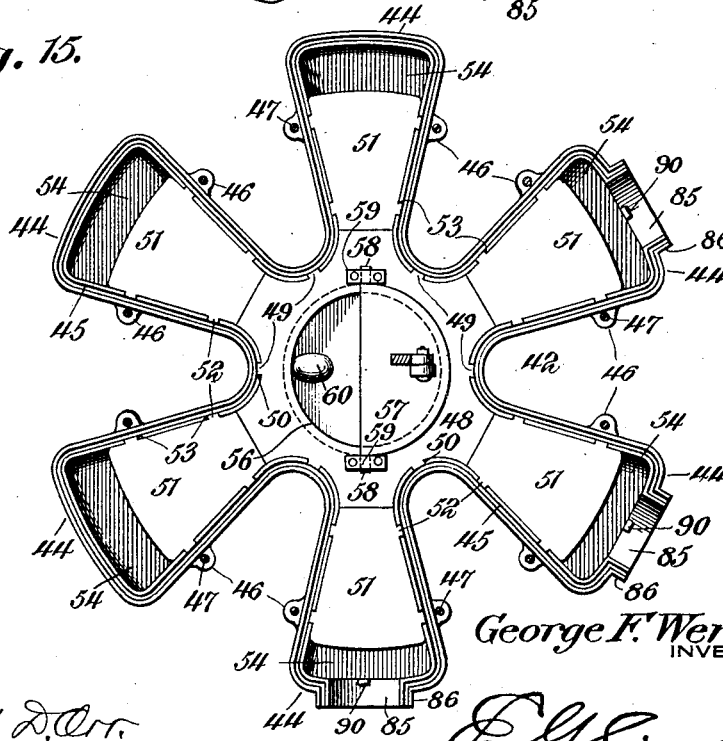

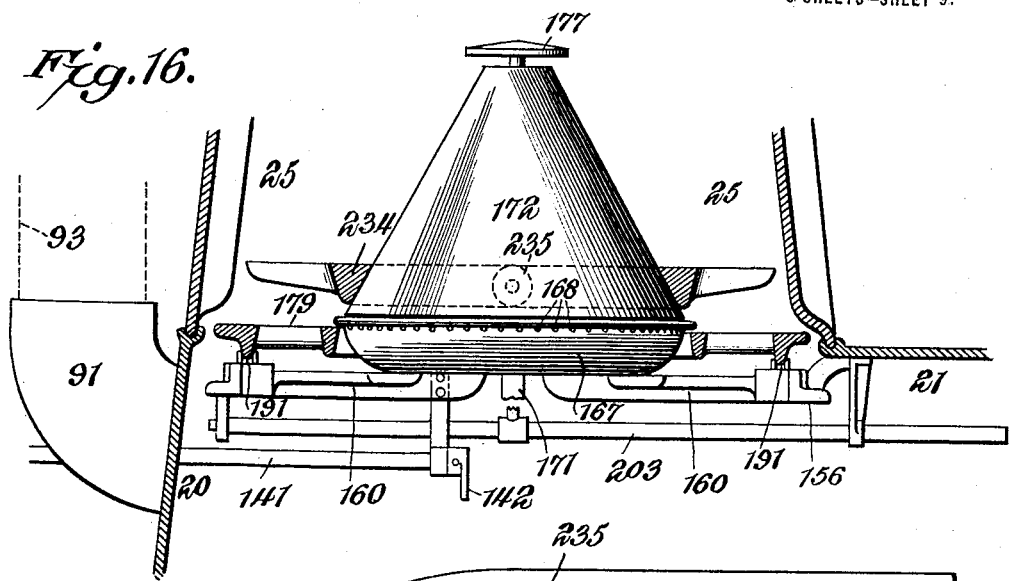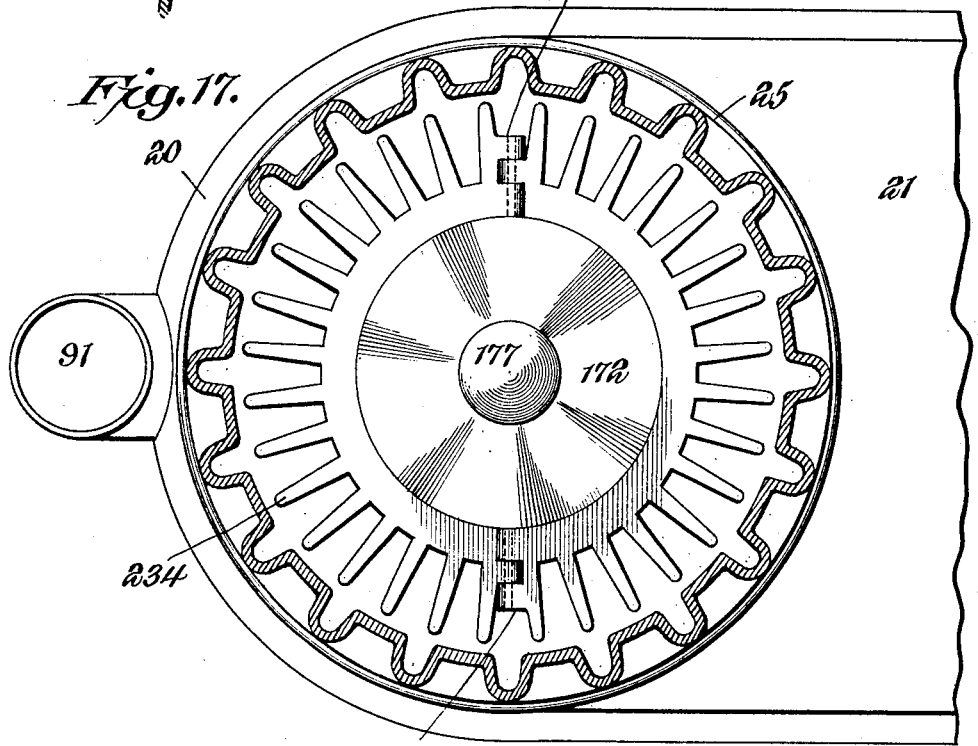

GEORGE FRANKLIN WENTZ, OF LAKEWOOD, OHIO.

HOT-AIR FURNACE.

1,386,294. Specification of Letters Patent. Patented Aug. 2, 1921.

Application filed April 11, 1917. Serial No. 161,223.

*To all whom it may concern:*

Be it known that I, GEORGE F. WENTZ, a citizen of the United States, residing at Lakewood, in the county of Cuyahoga and State of Ohio, have invented a new and useful Hot-Air Furnace, of which the following is a specification.

This invention has reference to hot air furnaces and its object is to provide a construction of hot air furnaces avoiding certain disadvantages of hot air furnaces as ordinarily constructed and possessing advantages peculiar to the invention.

In accordance with the invention there is provided a fire pot and a fire chamber of peculiar construction with a grate and actuating mechanism therein so arranged that the supports and actuating mechanism for the grate are protected from accumulations of ashes, while the grate provides for the elimination of clinkers, slate, etc., without material disturbance of the live fuel. Moreover, radiating members above the fire chamber and communicating therewith are provided with means for directing the products of combustion in a tortuous path through the radiator chambers or permitting such hot products of combustion to flow directly through the radiating chambers in a short path, so that when the feed door of the furnace is open for supplying fuel there is a direct flow to the chimney of smoke and gases, thereby preventing such smoke and gases from reaching the compartment in which the furnace is located. To facilitate the action of the furnace, the fuel door is connected through suitable mechanism to interior dampers associated with the radiators to cause the direct communication of the fire chamber with the smoke flue on opening the fuel door.

The construction is such that all parts of the furnace liable to be affected by the gases of combustion may be made of cast iron, which is a material particularly resistant to such gases.

The invention also comprises interior draft means in connection with the fire pot with a peculiar construction of fire pot and grate, as well as providing means for utilizing gas as a fuel in conjunction with coal as a fuel, so that the gas burner may be used alone or as a kindling means for a coal fire.

The invention also comprises other features which will hereinafter appear.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a perspective view of a furnace embodying the invention.

Fig. 2 is a vertical and substantially diametric section including a cold air inlet and ash-disposal pit, some parts being shown in elevation.

Fig. 3 is a perspective view of the furnace with the casing removed.

Fig. 4 is a section of the heating drum on the line 4—4 of Fig. 2, with distant parts omitted.

Fig. 5 is a section on the line 5—5 of Fig. 2.

Fig. 6 is a section on the line 6—6 of Fig. 2, but drawn on a larger scale.

Fig. 7 is an inverted plan view of the grate and operating means therefor, the scale being substantially that of Fig. 6.

Fig. 8 is a detail section of one of the grate hinges on the line 8—8 of Fig. 6.

Fig. 9 is a section on the line 9—9 of Fig. 6.

Fig. 10 is a section on the line 10—10 of Fig. 9.

Fig. 11 is a section similar to that of Fig. 9, but taken at right angles thereto, on the line 11—11 of Fig. 9.

Fig. 12 is a section on the line 12—12 of Fig. 9.

Fig. 13 is a section on the line 13—13 of Fig. 10.

Fig. 14 is a detail section on the line

14—14 of Fig. 2, drawn on a larger scale than Fig. 2 and omitting distant parts.

Fig. 15 is a section on the line 15—15 of Fig. 2 and drawn on the same scale as Fig. 14.

Fig. 16 is a view similar to Fig. 9, but showing certain parts in elevation which are indicated in section in Fig. 9, and also showing a grate structure in position for garbage incineration.

Fig. 17 is a plan view of parts shown in Fig. 16 with the fire pot in cross section, and omitting distant parts.

Fig. 18 is a detail view of a clamping structure for the casing of the furnace, the drawing being on a larger scale than others of the figures.

Fig. 19 is a section on the line 19—19 of Fig. 18.

Fig. 20 is a section on the line 20—20 of Fig. 18.

Referring to the drawings there is shown an upright frame composed of a top ring 1, a bottom ring 2 and upright connecting bars 3, the latter being preferably of T form with the web constituting the stem of the T directed outwardly. Certain of the uprights 3 are connected by arc bars 4, 5, respectively. Surrounding the frame is a casing divided up into sections 6, 7, respectively. The casing sections 7 are each of a height to rest on the ring 2 and reach the ring 1, and these rings have shoulders 8 against which the casing sections may abut. The rings also have flanges 9 forming backings for the casing sections.

The webs forming the stems of the T uprights 3 are provided at appropriate points with notches 10.

Along one long edge of each casing section 6 or 7, as the case may be, is an appropriate number of angle strips 11 having outturned angle ends 12, through each of which is threaded a screw 13 having a head 14 engaging in a notch 10 of a corresponding upright 3 when the casing section is in place in the furnace. The other long edge of each casing section 6 or 7, as the case may be, has fast thereto a bracket 15 to which is hinged a lock lever 16 with a cam head 17. The end of the bracket 15 to which the lever 16 is pivoted is indicated at 18, and is of a thickness to extend through an appropriate one of the notches 10. When the casing sections are in place with their edges abutting the uprights 3 on opposite sides of the central web, one edge of each section is held to a corresponding upright by the head 14 of the screw 13 and the other edge of the casing section is held to the next upright 3 in order by the engagement of the cam head 17 of each lever 16 on the casing section with the central web of such upright. The cam head 17 permits a tightening and locking of the casing on the skeleton frame of the furnace, while the screws 13 permit adjustment of the parts so that the casing sections are firmly anchored in place and yet may be detached at will. To facilitate the handling of the casing sections they are provided with handles 19.

The skeleton frame for supporting the casing is well shown in Fig. 3, while the locking means for the casing sections and the handles for manipulating them are well shown in Figs. 1, 18, 19 and 20.

The casing member 6 is arranged at what may be termed the front of the furnace and is traversed by certain parts to which reference will hereinafter be made.

The casing section 6 does not reach to the ring 2, but to another casing section $6^a$, the bottom portion of the section 6 and the top portion of the section $6^a$ resting against the arc 4 to which the casing section $6^a$ may be secured. The bottom portion of the section $6^a$ rests against and is secured to the arc 5, and between the latter and the corresponding portions of the ring 2 is still another casing section $6^b$. It is unnecessary that the sections $6^a$ and $6^b$ be removable, since the removal of the other casing sections exposes all parts of the interior of the furnace needing cleansing or access.

Lodged within the skeleton frame carrying the casing and at the lower portion thereof, is an ash pit casting 20 somewhat wider at the bottom than at the top, and when the furnace is provided with means for the disposal of ashes, as will hereinafter appear, the ash-pit casting is a bottomless casting. The ash pit casting has an extension 21 on one side reaching to the arc 5 and ring 2, and provided with a door 22 for access to the ash pit, the door carrying the usual draft door 23.

The ash-pit casting 20 is connected to the ring 2 by brackets 24 arranged at such intervals as may be deemed necessary for strong and rigid construction, while the rising walls are of substantially even thickness throughout and formed into a circular series of corrugations or channels on the inner face of the fire pot, each channel defining a hollow rib 26 on the exterior of the fire pot. Each hollow rib is substantially U-shaped in cross section, with the mouth of the channel slightly flaring in a direction toward the interior of the fire pot and the walls of the fire pot and of the ribs are of substantially constant thickness throughout, so that there is a practically even distribution of heat through the fire pot where it is exposed to the air occupying the space between the fire pot and the inner wall of the casing of the furnace.

The top of the casting 20 is provided with an opening or passage 28 with a surrounding groove 29 into which the lower edge of the fire pot seats, with the inner wall of the fire pot somewhat overhanging the opening 28.

The upper and narrower end of the fire pot is provided with an opening 30 having a surrounding groove 31 in which is seated another casting 32 also frusto-conical with the larger end at the bottom and inclosing the fire chamber of the furnace. Extending laterally from one side of the fire chamber is a neck 33 opening into the fire chamber at one end, and at the other end carrying a plate 34 exterior to the casing section 6ª and fast thereto and to the arc 4 by bolts 35 or otherwise. The plate 34 is provided with the usual flange opening 36 normally closed by a hinged door 37 constituting the fuel door of the furnace. There is nothing peculiar about the door 37, except that its hinge pintle is in the form of an extended rod 38 rising to near the top of the casing section 6, where it is provided with a journal bearing 39. The purpose of the rod 38, which is made fast to the part of the door hinge fixed to the door, will appear hereinafter.

The top of the fire chamber casting 32 is provided with an opening 40, and about this opening the fire chamber casting is formed with a circular seat 41 in which seats what constitutes the lower open end of a casting 42 forming approximately one-half of the body portion of a radiator. The other half of the radiator is in the form of a casting 43 similar to the casting. The meeting edges of the body portions 42 and 43 and arm sections 44 seat one on the other, the lower section 42 having a rib 45 with a continuous groove therein to receive what constitutes the upper section. The two sections are formed with matching lugs 46 traversed by bolts 47 by means of which the two sections are united to form a radiator. The lower section 42 of the lower radiator is divided interiorly from the upper section of the same radiator by a web 48 having lugs 49 seating in recesses 50 in the interior portion of the rib 45. In each arm 44 are other webs 51 having lugs 52 seating in recesses 53 in the inner edges of the ribs 45 of these arms. The webs 51 do not reach to the outer ends of the arms 44, but stop short thereof, so that the arm sections 44 of the radiator member 42 communicate with the arm sections 44 of the member 43 through passages 54. The purpose of this is to provide tortuous passages for hot products of combustion from the fire chamber traveling through the opening 40 into the interior of the body portion 42 of the lower radiator, thence to the ends of the arms 44 and returning to the interior of the body portion 43 of the same radiator, from whence they may escape through a top opening 55 therethrough.

The web 50 has a central opening 56 in line with the openings 40 and 55. Mounted in this opening is a flap damper 57 having diametric trunnions 58 mounted in bearings 59 on the web 48. This damper is so arranged that one-half of it is above the web 48 and the other half below it, so that the damper may rock in one direction and is stopped when rocked in the other direction in the closed position. A counter-weight 60 is carried by what constitutes the lower half of the damper and is so arranged as to overbalance the damper and tend to fully open it. Means are provided for closing the damper in opposition to the weight 60, and such means will be hereinafter referred to.

Surrounding the opening 55 the lower radiator section 43 has a grooved flange 61 receiving the open lower end of a radiator section 62 generally similar to the radiator section 42. The radiator of which the section 62 is a part has a similar part 63 completing it, and the radiator made up of the sections 62 and 63 and constituting the upper radiator is in general similar to the lower radiator. The top section 63 of the upper radiator rests upon the lower radiator section 62, and both sections are provided with lugs 64 secured together by bolts 65 or otherwise. The upper radiator has an intermediate web 66 lodged therein and held in place by lugs 67 similar to the web 48 of the lower radiator section. The upper radiator has radiating arms 68 similar and staggered with relation to the arms 44 of the lower radiator and each arm contains a division web 69 similar to the web 51 of the lower radiator, these webs 62 being held in place by lugs 70. The upper radiator has one of its radial arms extended in the form of a smoke duct 71 which, when the furnace is assembled, extends through a corresponding casing section 7 and is designed to receive the usual smoke pipe connected with the chimney of the building in which the furnace is installed.

In order to hold the various castings together, yokes 72 are arranged with terminal hooks 73 to engage over the junction flanges between the members 62 and 63 of the upper radiator, and these yokes are each secured to one end of a stay rod or bar 74, the other end of which is continued to and bolted to the ash pit casting 20, as indicated at 75, or the parts are otherwise joined as may be deemed expedient.

The structure described is in so far as concerns those parts subjected to gases of combustion, all composed of cast iron, this being advantageous since cast iron is particularly resistant to the effects of gases of combustion, and consequently the life of the furnace is correspondingly prolonged.

In the web or plate 66 there is a passage 76 normally closed by a damper 77 having pivot trunnions 78 at one end engaging in bearings 79 on the web or plate 66.

Adjacent to the pivoted end of the damper 77 there is erected thereon a lug or arm 80 to which is connected a rod 81 leading through one of the radiator arms 68 to the exterior thereof, where it is provided with a link or links 82 for a purpose to be described.

Fast to and depending from the lower face of the damper 77 is an arm 83 provided at its lower end with a roller 84 in position to bear upon that end of the damper 57 remote from the weighted end thereof, so that when the damper 77 is closed it forces the damper 57 to the closed position. When the rod 81 is pulled the damper 77 is swung upwardly about its pivots 78, thus carrying the roller 84 toward the pivotal axis of the damper 57, and finally beyond such axis toward the weighted end of the damper, whereupon the damper 57 is free to swing to an upright position under the action of the weight 60. This causes the opening of both dampers simultaneously and provides a free passage for gases of combustion and other matter from the fire chamber 32 directly to the flue 71 without such gases following the tortuous path through the arms 44 and 68 which the gases must traverse when the dampers are closed in order to reach the escape flue 71.

To provide access to the interior of the radiators in order to clear them from accumulations of soot or dust without the necessity of dismantling the furnace, certain of the arms of the radiators may be made shorter than others and at their outer ends have passages 85 surrounded by flanges 86 forming supports for caps 87. In order to retain the caps 87 in place they are traversed by bolts 88 carrying plates 89 at their inner ends, these plates engaging lugs 90 on the inner faces of the arms 44 or 68, as the case may be. Such lugs in conjunction with the flanges 86, where they form shoulders with the bodies of the arms 44 and 68, provide for the locking of the plates 89, which are in the form of angle members, in the arms by a partial turn thereof. Recesses in the angle plates permit their withdrawal past the lugs when brought into register therewith.

In the particular structure of the radiators as shown in the drawings the radiator arms are placed diametrically opposite so that it is only necessary that half of the arms be provided with caps 87. It will be understood, however, that all of the arms may be provided with caps if found desirable.

The ash pit casting 20 is provided with an elbow 91 on the side remote from the door 22, and connected to this elbow is an upright pipe 93 entering the bottom of the flue 71 within the furnace casing. In the flue is a damper 94 pivoted to the flue in position to close that end of the pipe 93 entering the flue 71. The damper 94 is connected to a rock arm 95 on a rock shaft 96 extending through and journaled in the pipe 93 and projecting to the exterior of the furnace casing where it is provided with another rock arm 97 controlled by a chain 98 or other suitable connection.

Mounted on the ring 1 is a distributing drum 99 provided with radially extending collars 100 for the attachment of hot air distributing pipes, as is customary in hot air furnaces, such pipes being indicated in dotted lines at 101 in Fig. 4.

Within the drum are dampers 102, one for each collar 100, each damper being connected to the drum by a hinge 103 so as to swing into and out of closing relation to the respective collar. The drum is provided with a top closure 104 shown as inset with relation to the drum, but it may be otherwise secured thereto. The hinges 103 are made fast to the cover 104 so that the dampers will gravitate to the closed position. Extending through each collar 100 is a rock shaft 105 with a rock arm 106 fast thereto within the collar, and another rock arm 107 fast to the shaft 105 outside of the collar. An elastically yieldable link 108 connects each arm 106 to the respective damper 102. A hook 109 on the free end of each rod 107 and an eye 110 appropriately located on the exterior of the drum 99 serves as a means for holding the damper 102 closed, while another eye 111 on the drum 99 is so located as to hold the damper open. By this means the dampers are all located within the drum instead of being located within the hot air pipes, as is customary, and hence all parts are confined to the furnace. By making the links 108 elastically yieldable to a limited extent the dampers may be closed tightly, so that there is no leakage of hot air through flues where it is not desirable.

Extending through the heating drum 99 at a point above the ring 1 is a hollow rock shaft 112 projecting at both ends beyond the drum. Extending through and beyond both ends of the hollow shaft 112 is a rock shaft 113. At one end of the hollow shaft 112 is a rock arm 114 and at the other end of the shaft is another rock arm 115 connected intermediately to the shaft so as to project oppositely therefrom. At the end of the shaft 113 remote from the rock shaft 114 is another rock arm 116 connected by a chain 117 or other flexible means to a rock arm 118 on a pintle 119 carrying a damper 120 within the flue 71, the damper being provided on one side of its axis of rocking with a weight 121 to constrain the damper to the closed position, the flue 71 containing a stop 122 limiting the damper to movement in one direction to the closed position. The damper 118 is opened by rocking the shaft 113 in the appropriate direction, and when the shaft is released from the force rocking it in such direction, the weight 121 returns the damper to the closed position.

The arm 114 is at that end of the shaft 113 which projects beyond the drum 99 on the side thereof coinciding with the door 37, and the arm 114 is connected to an arm 123 on the rod 38 by means of a chain 124, whereby when the door 37 is swung to the open position the shaft 113 is rocked in a direction to open the damper 120, and when the door is closed the damper moves to the closed position. By means of another chain 125 and hook 126 the smoke flue damper 120 may be opened and there held without regard to the door 37 when it is desired to start the furnace or to cause the fuel to burn rapidly.

In order that the opening of the door 37 may automatically provide a direct draft through the heating drums when fresh fuel is applied to the fire chamber, and thus avoid the possibility of smoke and gases escaping from the furnace through the open fire door, there is made fast to the pintle rod 38 a cam or sector 127. In the path of the cam 127 is a lever 128 mounted to rock upon a support 129 made fast to the furnace. Secured to the ring 1 or other suitable part of the furnace is a bracket 130 in which is mounted a rocker 131 having arms 132 and 133 at opposite ends. The arm 132 is connected by a bolt 134 or other suitable means to the lever 128, while the arm 133 is connected to the links 82. When the pintle rod 38 is moved by the door 37 the cam 127 is brought into engagement with the lever 128, which in turn pulls upon the arm 132 of the rocker 131, causing the latter to rock correspondingly, and this movement is transmitted through the arm 133 to the links 82, thereby similarly pulling the rod 81 and opening the dampers 77 and 57 in the manner already described. By properly proportioning the cam 127 and locating it in suitable relation to the lever 128 coaction of the cam and lever will cause the door 37 to remain open after having been moved beyond a certain position. When the door 37 is moved toward the closed position the locking action will cease, and the weight of the dampers and other parts controlled by the door will come into action to automatically close the door and hold it in the closed position.

At that end of the hollow shaft 112 where it projects through the front portion of the furnace, that is, at the end remote from the rock arm 115, is a rock or crank arm 135 connected to an arm 136 on the rod 38 by a chain 137 or otherwise.

The rock arm 115 is connected at opposite ends by chains 138 to the opposite ends of another rock arm 139 intermediately connected to a rock shaft 140 extending through a tube 141 into the ash pit and there provided with a crank arm 142 connected to certain parts to be described.

One of the collars extending from the drum 99, which collar is preferably the one located immediately over the smoke flue 71, and identified by the reference numeral 100$^a$, may be connected to the chimney or other outlet of the building for a purpose which will hereinafter appear.

The drum 99 receives and distributes the heated air from within the casing of the furnace and in order to properly humidify such air there is a water receptacle 143 supported within the drum by legs 144 rising from the upper heat radiator. The receptacle 143 is open at the top so that it is subjected to the absorbing action of a portion of the air before the latter is distributed through the building to be heated. The humidifier by being located high within the furnace is in an advantageous position to supply a requisite amount of moisture to the air, which is already heated and therefore in a condition to readily absorb the moisture. A supply pipe 145 leads from the exterior of the furnace into the humidifier, while a drain pipe 146 leads from the bottom of the humidifier receptacle to the exterior of the furnace.

Outside of the drum 99 the pipe 145 is provided with a valve 147 to which there may be connected a pipe 148 coming from a source of supply.

The pipe 146 is provided exterior to the casing with a coupling 149 from which rises a gage glass 150 to indicate the depth of water in the humidifying tank or receptacle 143, and below the coupling there is provided a valve 151 which may be utilized for the purpose of draining the humidifying tank when desirable.

Within the ash pit 20 and adjacent to the side thereof from which the elbow 91 leads there is secured a bracket 152 by bolts 153 or otherwise. This bracket extends generally in chord relation to the ash pit which is somewhat conical in shape and near the ends the bracket is formed on what constitutes its upper edge in the installed position with ledges 154, while near the lower edge of the bracket are spaced lugs 155 bored out to constitute journal bearings for a purpose to be described.

On the opposite or door side of the ash pit casting there is secured another bracket 156. Since at the door side the curved wall of the ash pit is omitted, the bracket 156 is secured by bolts 157 to the top of the ash pit casting between the opening 28 and the door side of the ash pit. The casting 156, which is made to conform generally to the curvature of the ash pit, has on its convex side a projecting lug 157$^a$ for a purpose to be described. On the other or inner side the casting is formed with a cradle bar 158 in substantially chord relation to the curvature of the ash pit, while the main part of the bracket 156 has depending lugs 159 formed thereon to constitute journal bearings, such lugs being suitably bored for the purpose.

Carried by the brackets 152 and 156 are similar castings 160 each having at one end oppositely directed arms 161 projecting from a frame terminal 162 of the casting and terminating in angle extensions 163 adapted in one case to the ledges 154 of the bracket 152 and in the other case resting upon the cradle 158 of the bracket 156, these extensions 163 being bolted or otherwise secured in place. Those ends of the supports 160 remote from the frames 162, and constituting the adjacent ends of the two supports, are in the form of yokes 164 upstanding from the level of the supports in the installed position and are joined together by coupling plates 165 or in any other suitable way. The supports thus connected receive one cross member 166 of a hollow circular burner 167 having marginal openings 168 constituting jets and closed in by a cover member 169. There is an additional cross member 170 for the burner and at the junction of the two cross members they are entered by a pipe 171 which may be assumed to be connected with a source of fuel such as gas.

Carried by the burner is a hollow cone 172 entering the fire pot 25, the cone being cut off at its apex and there open as shown at 173, and being less in its slant than the fire chamber. The fire pot 25 tapering upwardly and the cone 172 also tapering upwardly at a less pitch than the fire pot provide a fuel-containing chamber gradually widening from the bottom toward the top, so that even fine fuel, such as the very small grades of coal, will hold its place in the fire chamber because of the peculiar shape thereof.

Within the cone 172 are cross bars 174 spaced apart in the direction of the height of the cone and sustaining a tubular guide 175 receiving a guide rod 176 extending through the open upper end 173 of the cone and above the cone sustaining a cap plate 177 of such diameter as to override the open end 173 and direct any fuel which may enter the fire chamber into the fuel receiving space outside of the cone 172 and prevent entrance of such fuel into the cone. Moreover, the plate 177 may be brought down into engagement with the top of the cone and thereby close the opening 173 and prevent the entrance of air into the fire chamber through said opening. Moreover, the plate 177 serves as a spreader, not only for the fuel, but for air entering the fire chamber through the cone. The guide rod 176 is connected by a link 178 to the crank 142 so that by rocking the shaft 140 the cap plate 177 may be lifted for draft purposes or lowered to close the opening 173.

The bottom of the fire chamber between the outer wall of the burner 167 and the lower edge of the fire pot is occupied by a grate 179 of annular conformation with its inner periphery 180 underlying the cover of the burner and its outer peripheral portion provided with projections 181 underlying the corresponding portion of the fire pot, thus directing ashes, which may pass through the grate, between radial grate bars 182 forming parts of the grate.

The annular grate is made up of two similar and approximately semi-circular parts joined together by couplings 183, so that the grate may be dumped by tipping one or the other of the members of the grate about a diametric axis passing through the couplings 183.

Each coupling is composed of two intermeshing members 184, 185, respectively, connected together by bolts 186 with one of the two members, say, the member 185, formed on opposite sides with outstanding lugs 187, 188, respectively. Each grate member where connected together by the coupling 183 has pivot lugs 188$^a$ thereon entering journal passages 189 formed in the coupling, so that either grate member may pivot on the coupling and be moved to the dumping position. The outer peripheral portion of the grate is formed with a circular rib 190 on its lower surface, and engaging and supporting the grate by such rib are grooved rollers 191 journaled in the frames 162. This permits the shaking of the grate by imparting a rotative movement thereto about an upright axis. This is accomplished by links 193 connected to eyes 194 at diametrically opposite portions of the grate sections with such diameter at substantially right angles to the diameter traversing the couplings 183. Those ends of the links 193 remote from the eyes 194 are connected to opposite ends of a rock lever 195 supported midway of its ends by a bolt 196 or other suitable member extending through the ear 157$^a$ and also if desirable through the top of the ash pit. An arm 197 is arranged perpendicular to the rock arm 195 at the pivot point of the latter, and this arm has an extension 198 with a notch or recess 199 in its outer end. The extension 198 is designed to enter a socket 200 in one end of a shaker bar 201 of a length to pass through the front of the fire chamber, while a pin 202 extending transversely of the socket 200 will then enter the notch 199 and temporarily lock the shaker bar to the rock arm 195, so that by a suitable reciprocatory movement of the shaker bar where accessible to an operator, the arm 195 is rocked and the grate is given a corresponding reciprocatory movement, this resulting in the action known as shaking the grate.

In order to sustain the grate sections from falling, and in order to permit the dumping of the grate when desired, two rock bars 203, 204 are provided. These bars are journaled in the lugs 155 and 159 of the brackets 152 and 156, respectively, and are continued toward the door of the ash pit adjacent to which each bar is formed with a terminal slot 205 to receive a manipulating member such as the shaker bar 201 which may be used for the purpose. Each bar 203, 204 at a point about midway of the two brackets 152 and 156 has fast thereto an arm 206 extending at about right angles to it and bent so as to underride the grate sections midway between their pivot hinge connections and close enough to the grate so that the rib 190 will engage the arm 206, thereby upholding the grate in a substantially level condition. At the end of each arm 206 remote from the bar 203 or 204 to which it is attached, the arm carries a pendent latch block 207 in the path of which is a slide bar 208 sustained adjacent to the latch 207 by a guide bracket 209. The bar 208 is extended through the front wall of the ash pit and there has a manipulating handle 210 whereby the bar may be moved lengthwise. At the inner end the bar 208 is provided with a nose 211 limiting the outward movement of the bar 208 by engagement with the bracket 209. By moving the bar 208 from beneath the latch 207 the arm 206 is released and the grate section carried thereby may gravitate to the dumping position following a path indicated by a dotted line 212. The free end of the arm 206 follows the dotted line 213 indicated in Fig. 11.

The extent of dumping may, of course, be controlled by the manipulating or shaking bar 201 temporarily applied to the grate-controlling bar or rod 203 or 204, as the case may be.

When it is desired to return the grate to its normal position the arm 206 is moved in a direction to lift it and engage the dumped grate section and finally return it to its proper or level position, when the latch member 207 is sufficiently elevated to permit the return of the holding bar 208 beneath it.

When the furnace is installed in a building there may be provided a storage pit 214 sunk in the floor above which the furnace rises. This pit may be lined with walls 215 of concrete or brick or whatever material is desired, and under these circumstances the ash pit 20 has an opening 216 through its bottom.

Immediately beneath the furnace and located in the upper portion of the storage pit 214 is a duct 217 into which leads a cold air pipe 218 coming from the exterior of the building, as is customary. The duct 217 underlies the marginal portions of the furnace, so that there is no communication between the storage pit and the portions of the furnace exterior to the fire pot and associated parts.

The ash storage pit aside from where it communicates with the ash pit through the opening 216 may have a floor 219 with a removable section or trap 220 whereby access may be had to the storage pit.

Located within the storage pit below the ash pit of the furnace is a screen frame 221 supported at one end upon a rocker link 222 and hung from an intermediate point upon other links 223, the links 223 being longer than the links 222. In order to impart a longitudinal movement to the screen frame, a rocking lever 224 is connected to the frame and is accessible from the exterior of the furnace above the floor 219.

That portion of the screen frame 221 underlying the ash pit 20 is provided with a bottom of screen material 225, while the portion of the screen frame underneath the trap 220 has a solid bottom 226.

In order to direct material falling from the ash pit into the screen frame a deflector 227 is provided on that portion of the ash pit remote from the door, whereby the screen frame may be rocked to the desired extent for sifting ashes without being rocked to such an extent that any ashes falling from the furnace will not reach it, but pass about one end thereof. The peculiar rocking movement of the screen frame due to the difference in length and arrangement of the links 222 and 223 not only thoroughly agitates the ashes and removes all fine ashes from the coarser ashes, but tends to cause the movement of the sifted ashes on to the solid bottom 226 when they may be easily reached on opening the trap door 220.

The front portion of the furnace ash pit may have a beveled edge 227ª, so that sweepings from the floor 219 may be readily directed into the ash pit when the door of the ash pit is open.

The furnace is suited for either coal as a fuel or gas as a fuel, and in the event of coal being used as the fuel, the gas burner immediately above the grate provides means for readily kindling the fuel.

The upward taper of the fire pot prevents any packing of the fuel, this anti-packing feature being improved by the presence of the interior draft cone extending through the fire pot and preferably somewhat above it.

When fine fuel is used the spreader plate 177 tends to distribute the fuel, while the larger particles or lumps of the fuel naturally gravitate toward the inner walls of the fire pot holding the finer particles toward the cone 172. This in conjunction with the channels 27 in the fire pot provides numerous air ducts greatly facilitating the thorough burning of the fuel and the elimination of smoke.

Moreover, the fuel burns vigorously immediately adjacent to the inner wall of the fire pot, while the fuel adjacent to the cone 172 constitutes a reservoir of fuel similar in effect to the so-called self-feeding furnaces, supplying relatively fresh fuel to the vigorously burning bed of fuel close to the walls of the fire pot. The result is that the walls of the fire pot become highly heated and being relatively thin the heat is transmitted to the air exterior to the fire pot but confined within the furnace casing.

A very large proportion of the heat units is therefore utilized in heating the air distributed to the building to be heated, and the heat units which escape from the furnace are far less than are usually lost in furnaces of customary construction.

The transfer of heat further occurs through the walls of the fire chamber and through the walls of the radiators housed within the furnace casing, so that by the time the products of combustion reach the escape flue but little heat remains in them, and so the efficiency of the furnace is correspondingly high.

The chain 98, as well as another chain 228 connected to the door 23 and other connections to the damper 120, may be provided for draft purposes, in this respect following the usual custom, and so needing no special description.

What is claimed is:—

1. In a hot-air heater, a frusto conical fire pot tapering upwardly and provided with inwardly opening hollow ribs on its outer wall of U-shaped cross section, and a centrally located cone tapering upwardly to a less height and more rapidly than the fire pot.

2. In a hot-air heater a frusto conical fire pot tapering upwardly and provided with inwardly opening hollow ribs on its outer wall of U-shaped cross section, a centrally located cone tapering upwardly to a less height and more rapidly than the fire pot, and an annularly shaped grate between the base of the fire pot and the base of the central cone.

3. In a hot-air furnace, an upwardly tapering fire pot, and a centrally located cone within and spaced from the lower end of the fire pot and tapering upwardly more sharply and at a greater angle than said fire pot, the cone being hollow and provided with an air duct therethrough opening above the fuel level of the fire pot and said fire pot having upright channels on its inner face, each flaring toward the longitudinal center line of the pot.

4. In a hot air furnace, a fire pot tapering upwardly, an upwardly tapering hollow cone within the fire pot and having its top above the fuel level of the fire pot, the pitch of the cone being less steep than that of the fire pot, and an adjustable cap covering the upper small end of the cone for deflecting fuel toward the fire pot, said cap being adjustable in an up and down direction to open and close the upper end of the hollow cone.

5. In a furnace, a fire pot, a cone located therein, and an annular grate between the lower end of the cone and the lower end of the fire pot and overridden by both for sustaining fuel between the inner wall of the fire pot and the outer wall of the cone, said grate being mounted to rotate for shaking purposes and rockable for dumping purposes.

6. In a furnace, a fire pot and an annular grate therefor formed of sections hinged together diametrically, and means for holding the sections in position to close the bottom of the fire pot and for releasing the sections individually for dumping purposes.

7. In a furnace, a fire chamber, an annular grate therefor composed of two similar sections with hinge connections at the adjoining ends diametrically of the grate, means located beneath the grate for sustaining it, means located below the grate for imparting rotary rocking motion to the grate on its sustaining means, and other means located below the grate for upholding the hinged sections and for releasing the hinged sections to gravitate about a diametric axis to dumping position.

8. In a furnace, a fire chamber, an annular grate therefor composed of two similar sections with hinge connections at the adjoining ends along a diametric axis, means located beneath the grate for sustaining it, means located below the grate for imparting rotary rocking motion to the grate on its sustaining means, and other means located below the grate for upholding the hinged sections and for releasing the hinged sections to gravitate to dumping position, said upholding means for the grate sections having latch devices associated therewith for supporting the upholding means in the upholding position.

9. In a furnace, a fire chamber, an annular grate therefor composed of two similar sections with hinge connections at the adjoining ends along a diametric axis, means located beneath the grate for sustaining it, means located below the grate for imparting rotary rocking motion to the grate on its sustaining means, and other means located below the grate for upholding the hinged sections and for releasing the hinged sections to gravitate to dumping position, said upholding means for the grate sections having latch devices associated therewith for supporting the upholding means in the upholding position, and said upholding means having extensions accessible from the exterior of the furnace for operating said upholding means to the grate sustaining position.

10. A hot air furnace provided with a fire pot tapering toward the upper end, a cone within the upper end tapering toward the upper end more rapidly than the fire pot and extending above the fuel level of the fire pot, a grate for closing the fire chamber, a gas burner at the lower end of the cone above the grate, and a supplemental grate introducible into the fire pot through the upper end thereof and of a size to surround the cone and be sustained thereby above the gas burned and constituting a supporting grate for garbage and other waste material.

11. A hot air furnace provided with a fire pot having an interior cone spaced from the inner walls of the fire pot, a gas burner underriding the cone, a grate for the fire pot, and a two-part foldable grate introducible into the fire pot through the upper end thereof and of a size to engage the cone near the large end of the latter in elevated spaced relation to the gas burner and the first-named grate.

12. A garbage incinerator comprising a receptacle for garbage, and a gas burner underlying said receptacle and having openings to direct flames against outside walls thereof.

13. A garbage incinerator comprising a receptacle for garbage, means for upholding the receptacle, and a gas burner underlying the receptacle in position to direct flames against the outside walls of said receptacle for applying heat to garbage within the receptacle.

14. A hot air furnace provided with a fire pot tapering toward the upper end and having upright channels in its inner face, an upwardly tapering cone within the fire pot in spaced relation to the channeled walls and defining a chamber for the reception of fuel about the cone, an annular grate for the bottom of the fire chamber, and an annular gas burner beneath the cone and above the grate and discharging into the fuel receiving space.

15. A hot air furnace provided with a fire pot tapering toward the upper end and having upright channels in its inner face, an upwardly tapering cone within the fire pot in spaced relation to the channeled walls and defining a chamber for the reception of fuel about the cone, an annular grate for the bottom of the fire chamber, and an annular gas burner beneath the cone and above the grate and discharging into the fuel receiving space, the cone being hollow and provided with an adjustable cap for permitting air to enter the lower end of the cone and discharge beneath the cap above the fuel level of the fire chamber.

In testimony that I claim the foregoing as my own, I have hereto affixed my signature in the presence of two witnesses.

GEORGE FRANKLIN WENTZ.

Witnesses:
  A. D. BEHRINGER,
  ALBERT BRAY.